US012639786B2

(12) United States Patent
Forouhesh-Tehrani et al.

(10) Patent No.: US 12,639,786 B2
(45) Date of Patent: May 26, 2026

(54) MULTIPLEXED SUPER-RESOLUTION LABEL-FREE NONLINEAR MICROSCOPY

(71) Applicant: The Board of Trustees of the University of Illinois, Urbana, IL (US)

(72) Inventors: Kayvan Forouhesh-Tehrani, Urbana, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 792 days.

(21) Appl. No.: 18/160,020

(22) Filed: Jan. 26, 2023

(65) Prior Publication Data

US 2023/0237618 A1 Jul. 27, 2023

Related U.S. Application Data

(60) Provisional application No. 63/303,435, filed on Jan. 26, 2022.

(51) Int. Cl.
G06T 3/4053 (2024.01)
G06T 5/50 (2006.01)

(52) U.S. Cl.
CPC ............. G06T 3/4053 (2013.01); G06T 5/50 (2013.01); G06T 2207/10056 (2013.01); G06T 2207/20084 (2013.01); G06T 2207/20212 (2013.01)

(58) Field of Classification Search
CPC .................... G06T 3/4053; G06T 5/50; G06T 2207/10056; G06T 2207/20084; G06T 2207/20212; G06T 5/60; G06T 2207/10152; G06T 2207/20221; G01N 21/6458

See application file for complete search history.

(56) References Cited

PUBLICATIONS

Astratov, V. (Ed.). (2019). Label-free super-resolution microscopy (p. 371). Cham: Springer. (Year: 2019).*
Castello, Marco, et al. "A robust and versatile platform for image scanning microscopy enabling super-resolution FLIM." Nature methods 16.2 (2019): 175-178.
Huff, Joseph. "The Airyscan detector from ZEISS: confocal imaging with improved signal-to-noise ratio and super- resolution." (2015): i-ii.
Gregor, Ingo, et al. "Rapid nonlinear image scanning microscopy." Nature methods 14.11 (2017): 1087-1089.
York, Andrew G., et al. "Instant super-resolution imaging in live cells and embryos via analog image processing." Nature methods 10.11 (2013): 1122-1126.

* cited by examiner

*Primary Examiner* — Kent Yip
(74) *Attorney, Agent, or Firm* — Quarles & Brady LLP

(57) ABSTRACT

Super-resolution label-free microscopy is provided using multiplexed, temporally modulated acquisition patterns of emission point spread functions ("PSFs"). Supercontinuum ultrafast pulses can be used to enhance nonlinear processes, such as autofluorescence and harmonic generation, in order to provide super-resolution imaging of nonlinear label-free signals. Images can be reconstructed using various reconstruction techniques, including pixel reassignment, wavelet reconstruction, and deep learning model-based reconstructions.

19 Claims, 11 Drawing Sheets

ISM Grid collection frame 0

Gradient collection gX                              gY

MULTIPLEXED SUPER-RESOLUTION LABEL-FREE NONLINEAR MICROSCOPY

CROSS-REFERENCE TO RELATED APPLICATIONS

This application claims the benefit of U.S. Provisional Patent Application Ser. No. 63/303,435, filed on Jan. 26, 2022, and entitled "APPARATUS AND ALGORITHMS FOR MULTIPLEXED UP-CONVERSION SUPER-RESOLUTION HARMONIC-GENERATION MICROCOPY," which is herein incorporated by reference in its entirety.

STATEMENT OF FEDERALLY SPONSORED RESEARCH

This invention was made with government support under R01CA241618 awarded by the National Institutes of Health. The government has certain rights in the invention.

BACKGROUND

Super-resolution microscopy modalities developed in the past twenty-five years for biological imaging. These super-resolution microscopy modalities, however, rely on the inherent properties of exogenous or endogenous fluorescent markers, such as depletion of fluorescence, blinking, or its incoherent nature, to break the diffraction-limit and produce super-resolution images. Because label-free nonlinear microscopy techniques (e.g., harmonic generation and multiphoton autofluorescence) do not rely on the use of exogenous or endogenous markers, these modalities cannot make use of existing super-resolution microscopy techniques. There remains an unmet need, then, for super-resolution label-free nonlinear microscopy

SUMMARY OF THE DISCLOSURE

The present disclosure addresses the aforementioned drawbacks by providing a method for generating an image of a sample using label-free microscopy. The sample is excited via a laser light source, and optical signal data are acquired by detecting light emitted by the sample by scanning the emitted light over pixels in a camera. The emitted light is scanned over the pixels according to a spatial pattern. Additional optical signal data are acquired by detecting the light emitted by the sample by scanning the emitted light over pixels in the camera while temporally modulating the spatial pattern. An image is then reconstructed from the optical signal data and the additional optical signal data.

It is another aspect of the present disclosure to provide a method for generating a super-resolution image of a sample using label-free microscopy. The sample is excited by scanning a femtosecond light source over the sample while temporally modulating the femtosecond light source to produce a spatial pattern. The optical signal data are acquired by detecting light emitted by the sample over pixels in a camera. The emitted light is projected over the pixels according to a spatial pattern. Additional optical signal data are acquired by moving the spatial pattern exciting the sample in at least one spatial dimension, and detecting the light emitted by the sample over pixels in the camera. A super-resolution image is then reconstructed from the optical signal data and the additional optical signal data.

The foregoing and other aspects and advantages of the present disclosure will appear from the following description. In the description, reference is made to the accompanying drawings that form a part hereof, and in which there is shown by way of illustration one or more embodiments. These embodiments do not necessarily represent the full scope of the invention, however, and reference is therefore made to the claims and herein for interpreting the scope of the invention.

DETAILED DESCRIPTION

Figure 1:
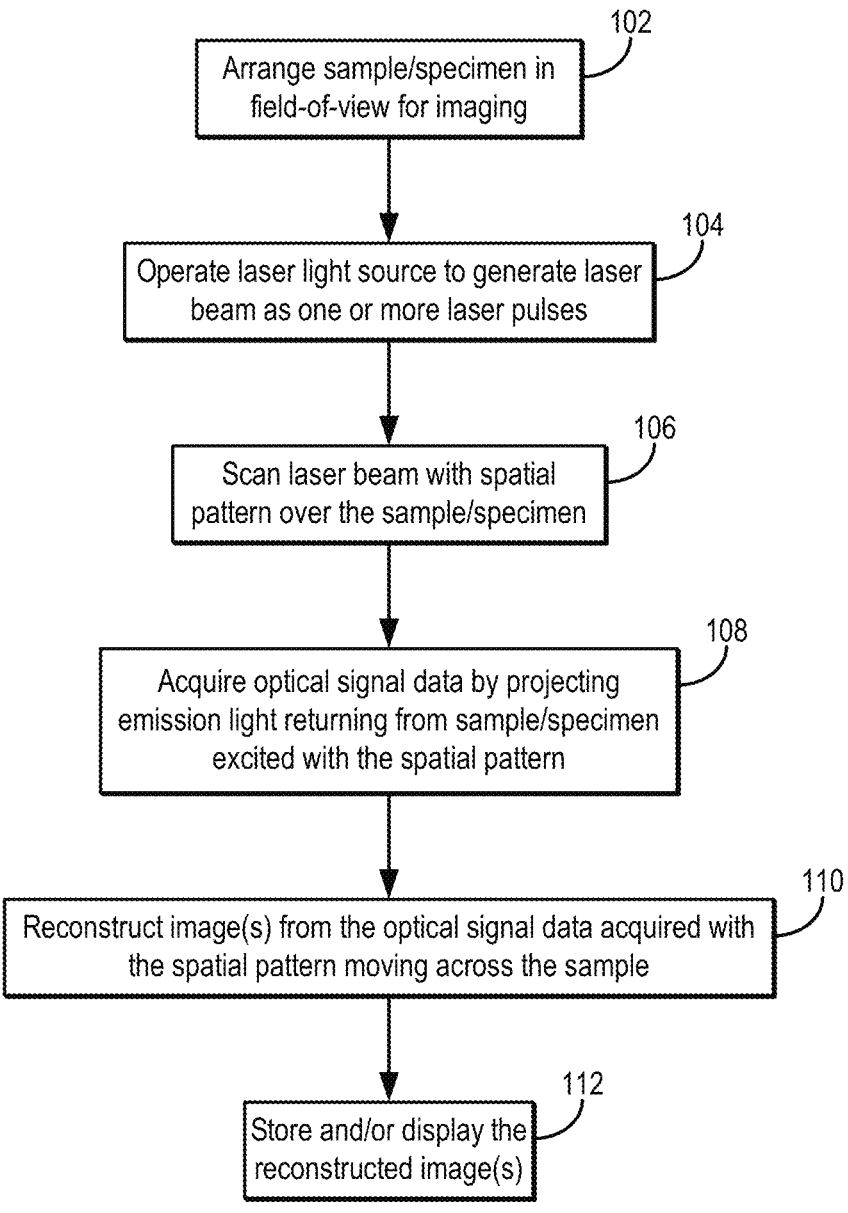
FIG. 1 is a flowchart setting forth the steps of an example method for super-resolution label-free nonlinear image scanning microscopy.

Described here are systems and methods for super-resolution image scanning microscopy ("ISM"), which provide for fast, label-free nonlinear microscopy at higher spatial resolutions than attainable with conventional label-free nonlinear microscopy techniques while maintaining high levels of signal-to-noise ratio ("SNR"). In general, the systems and methods described in the present disclosure use individual emission point spread functions ("PSFs") that are re-scanned through pixels on a camera, which mimic pinholes, to provide high-resolution imaging.

Advantageously, individual pixels on a camera, such as a charge-coupled device ("CCD") camera, can mimic pinholes. Therefore, in some embodiments the emission PSF is scanned over individual pixels on a camera. For instance, multiphoton ISM utilizes a shorter emission wavelength and confocal acquisition by exploiting each pixel on the camera as a pinhole. Numerical reconstruction techniques are then applied to achieve sub-diffraction-limit resolution. In some embodiments, a multiplexed approach is used for signal acquisition using an electron-multiplying charge-coupled device ("EMCCD") camera. A spatiotemporal modulation scheme is employed to direct ultrafast laser pulses to select foci within a field-of-view. Combined with the image acquisition methods described in the present disclosure, a super-resolution image resolution on the order of 100 nm can be achieved using as few as 49 raw images.

Embodiments of the present disclosure combines a variation of the image scanning microscopy ("ISM") technique with supercontinuum ultrafast pulse generation, and a corresponding reconstruction algorithm to produce high-resolution harmonic generation, or other label-free nonlinear, microscopy. Additionally or alternatively, a femtosecond laser source, which produces broadband light, can also be used as the light source.

Certain embodiments use a pulse modulator for time-gating of PSFs to specific locations on the field of view desired in each frame. Precise synchronization between the pulse modulator, camera trigger, and 2D scanning system (either galvo-galvo, resonant-galvo, or polygon-galvo) to produce the patterns required for multiplexed imaging. N images should be taken to cover the whole field of view. N is a function of the pattern style (grid or stripe), spacing, and total number of pixels within the field of view.

Supercontinuum ultrafast pulses enhance nonlinear processes, including second order nonlinear processes, such as second harmonic generation ("SHG") and 2-photon excitation fluorescence ("2PF"); third order nonlinear processes, such as third harmonic generation ("THG") and 3-photon excitation fluorescence ("3PF"); fourth order nonlinear processes, such as 4-photon excitation fluorescence ("4PF"); coherent anti-Stokes Raman spectroscopy ("CARS"); sum frequency generation; difference frequency generation; four-wave mixing; and so on, by reducing the pulse width and increasing the peak power of each pulse. Without supercontinuum, longer exposure time or averaging may be required to achieve nonlinear label-free imaging. Combining supercontinuum ultrafast light with ISM enables super-resolution imaging of nonlinear label-free signals.

For fast reconstruction of grid pattern acquisition a deep learning algorithm can be employed. The algorithm is trained from synthetic datasets, and performs pixel reassignment and deconvolution concurrently. A wavelet transform based reconstruction can be used for reconstruction of stripe pattern acquired data, in which the patterns make gradients of the field in X and Y, and a wavelet transform up-converts the image by a factor of two.

The general idea of ISM techniques is to collect individual point spread functions and to treat each pixel on a camera that collects the PSF as a pinhole. In this way, ISM techniques are similar to confocal microscopy techniques, but with multiple pinholes to collect all photons.

Raw images that are acquired with ISM techniques will have relatively large PSFs and, therefore, lower image resolution. Using pixel reassignment on the raw images, the PSFs can be narrowed and image resolution improved. Further improvements in image resolution can be achieved by filtering the ISM image, such as by using Fourier reweighting. Additionally or alternatively, other reconstruction techniques can be used to reconstruct super-resolution images, including wavelet-based reconstruction techniques and/or deep learning-based reconstruction techniques.

As an example, for multiphoton microscopy near-infrared light may be used. In these instances, 1040 nm coherent light may be used, which produces a PSF that is about 700 nanometers wide. By scanning the emission PSF on the camera, the PSF on each pixel can be expanded. Then, the effective 2-photon excitation PSF would be about 500 nm, and the incoherent emission PSF is about 250 nanometers. Using the multiplexed acquisition techniques described in the present disclosure, improved spatial resolutions can be achieved.

For instance, a pulse modulator can be used time-gating the PSFs to specific locations on the field-of-view desired in each frame. Precise synchronization between the pulse modulator, camera trigger, and 2D scanning system is used to produce the patterns (e.g., grid patterns, stripe patterns) used for multiplexed imaging. Using these techniques, a number of images are taken to cover the whole field-of-view. For instance, using each pixel on the camera as a pinhole, light is collected both within the pinhole area and also on the ends. By using each camera pixel as a separate sensor, different images are reconstructed and combined (e.g., using pixel reassignment) to add all of these raw images together to produce a high SNR images with improved resolution. Temporal resolution is improved by multiplexing the PSF over the field-of-view and collecting a portion of the PSFs at a time, as described above.

Referring now to FIG. 1, a flowchart is illustrated as setting forth the steps of an example method for super-resolution label-free microscopy. The method includes arranging a sample and/or specimen within a field-of-view of the a super-resolution label-free microscopy system, which in some embodiments may be a label-free image scanning microscopy ("ISM") system, as indicated at step 102. For instance, arranging the sample and/or specimen within the field-of-view can include arranging the sample and/or specimen on a stage of the ISM system for imaging.

The laser light source of the ISM system is then operated to generate a laser beam that is temporally modulated, as indicated at step 104. The temporally modulated laser beam is scanned over the sample, as indicated at step 106, to generate the spatial pattern and the ensuing emission optical signal data that are collected by a camera. As described above, the optical signal data can be nonlinear optical signal data, such as SHG data, THG data, 2PF data, 3PF data, 4PF data, autofluorescence data (e.g., 2PAF, 3PAF, 4PAF), Raman scattering data, and so on.

The emission light returning from the sample is projected over the surface of the camera, as indicated at step 108. In general, the emission light can be scanned in a multiplexed nonlinear PSF acquisition using a temporally modulated scanning pattern, such as by using temporally modulated grid patterns, temporally modulated stripe patterns, or other temporally modulated patterns.

Figure 2:
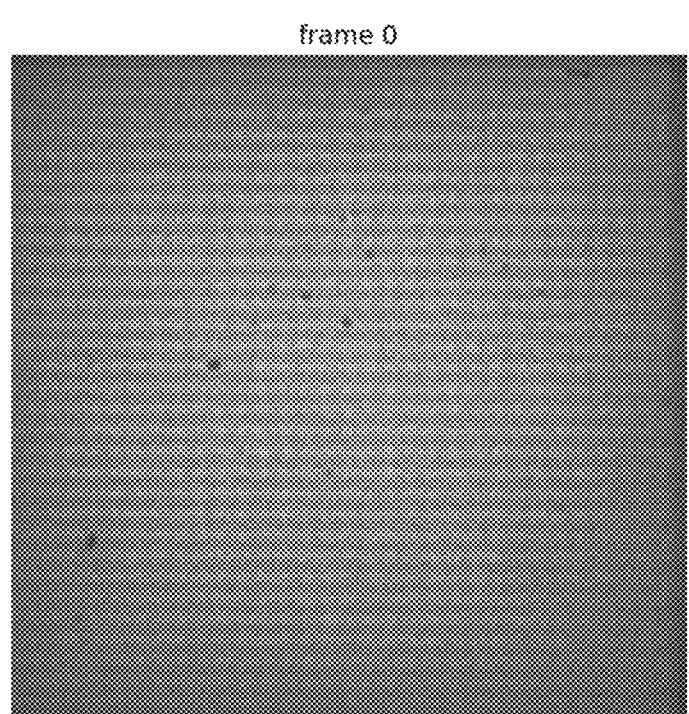
FIG. 2 illustrates an example frame of a temporally modulated grid pattern of emission point spread functions ("PSFs") on a camera.

As one example, the emission light can be scanned in a temporally modulated grid acquisition, in which the emission light is scanned over the surface of the camera in a grid pattern. The grid pattern is temporally modulated (e.g., spatially shifted) from one acquisition to the next while acquiring optical signal data. For example, as shown in FIG. 2, a grid acquisition can be made of 32 grids and 32 PSFs with 1.6 micron spacing. A full frame can be acquired in around 200 ms, and 256 frames acquired for a complete reconstruction.

As another example, the emission light can be scanned in one or more temporally modulated stripe patterns. For instance, a first stripe pattern may be composed of horizontal stripes scanned over the surface of the camera, and a second stripe pattern may be composed of vertical stripes scanned over the surface of the camera. The stripe patterns can be temporally modulated (e.g., spatially shifted) from one acquisition to the next while acquiring optical signal data. The optical signal data acquired using these different stripe patterns can subsequently be combined (e.g., during image reconstruction), as described below in more detail.

In some embodiments, the system may also include a conventional multiphoton detection portion, such as those that implement photomultiplier tubes ("PMTs"). In these instances, the system can be operated to switch between an ISM detection and a conventional multiphoton detection mode. When operating in a conventional multiphoton detection mode, optical signal data are collected by multiple high-sensitivity detectors such that multiple different imaging modalities, contrasts, and/or processes can be simultaneously and independently measured. For example, a first PMT can acquire optical signal data indicative of a 2-photon order imaging process, such as 2PAF; a second PMT can acquire optical signal data indicative of a 3-photon order imaging process, such as 3PAF; and a third PMT can acquire optical signal data indicative of a 4-photon order imaging process, such as 4PAF. Additionally or alternatively, other PMTs can be implements to acquire optical signal data indicative of other n-photon order imaging processes. For instance, a one or more additional PMTs can acquire optical signal data indicative of other 2-photon order imaging processes, such as 2PF and/or SHG; other 3-photon order imaging processes, such as THG; 1-photon order imaging processes, such as optical coherence tomography and/or confocal reflectance microscopy; and so on.

Images are then reconstructed from the optical signal data, as indicated at step 110. Using the multiplexed acquisitions and reconstruction techniques described in the present disclosure, the reconstructed images can have pixel sizes on the order of a few hundred nanometers or less, such as on the order of 100 nanometers. In this way, super-resolution imaging for label-free nonlinear microscopy is provided.

In some implementations, images can be reconstructed using a pixel reassignment process, in which, for each scanned position, a raw image is acquired (e.g., by determining the excitation spots in the acquisition pattern and extracting the image therefrom). The raw image is then shrunk and added to a running-total image that represents the reconstructed image. In some embodiments, a deconvolution can be performed simultaneously with the pixel reassignment. Additionally or alternatively, the raw images can be multiplied with a Fourier domain mask to remove blurring and background content. Additionally or alternatively, images reconstructed via pixel reassignment can be further processed (e.g., using Fourier reweighting) to further improve resolution. As a non-limiting example, images can be reconstructed from optical signal data acquired using a multiplexed grid acquisition using pixel reassignment.

Figure 3:
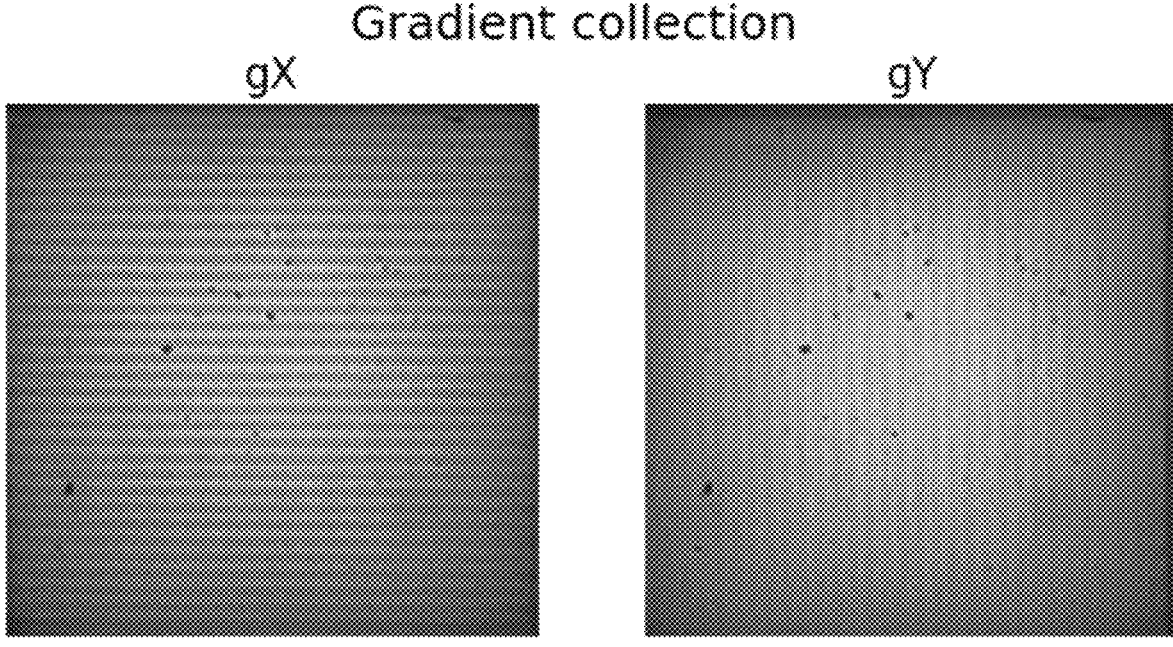
FIG. 3 illustrates gradients of example frames of temporally modulated stripe patterns of emission PSFs on a camera.
Figure 4:
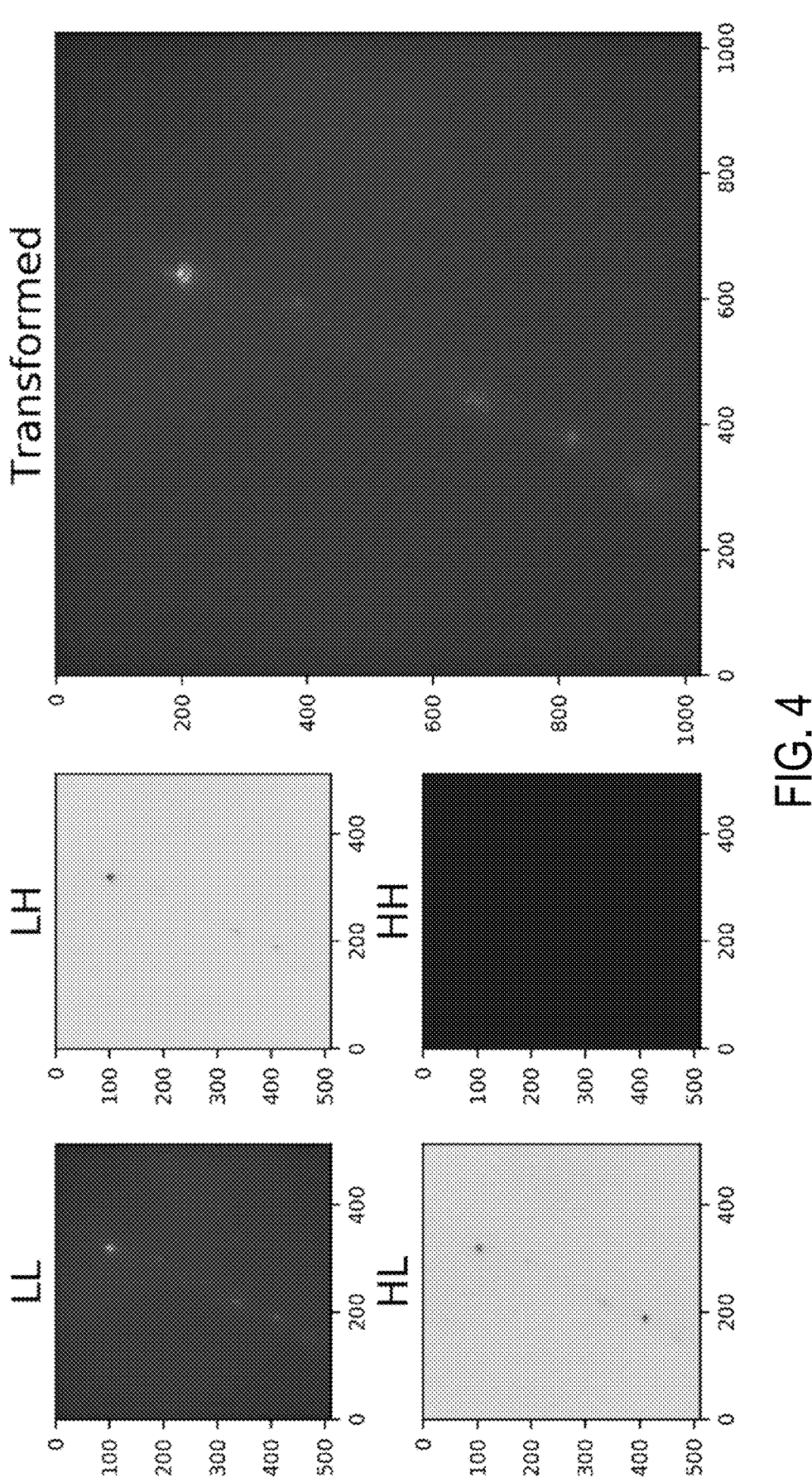
FIG. 4 illustrates an example process of a wavelet reconstruction.

Advantageously, in some embodiments images can be reconstructed using a wavelet reconstruction technique. In these instances, gradients of the field of view are computed in two or more directions (e.g., the x-direction, the y-direction) and an inverse wavelet transform of the calculated gradient fields is used for reconstruction. As one example, when the optical signal data have been acquired using temporally modulated stripe pattern acquisitions (e.g., horizontal, or x-direction, stripes; and vertical, or y-direction, stripes), a wavelet transform-based reconstruction can be used to reconstruct stripe pattern acquired data. The patterns make gradients of the field in the x-direction and y-direction, as shown for example in FIG. 3, and the wavelet transform up-converts the image by a factor of two. In general, four components of the wavelet transform are constructed using the individually captured PSFs in the optical signal data. As noted, wavelet up-conversion doubles the number of pixels and extracts sub-voxel information, thereby resulting in super-resolution images. FIG. 4 illustrates an example wavelet reconstruction.

In still other embodiments, a deep learning reconstruction model that has been trained on training data (e.g., synthetic data) can be used to reconstruct images. In these instances, described below in more detail, the optical signal data are input to the deep learning reconstruction model, generating reconstructed images as an output.

When the optical signal data additionally include multiphoton optical signal data, images can also be reconstructed or otherwise generated from the multiphoton optical signal data, with different images corresponding to the different imaging modalities, contrasts, and/or processes that were simultaneously measured by the multiphoton detection portion of the microscopy and/or imaging system. As a non-limiting example, images corresponding to 2PAF, 3PAF, 4PAF, and THG can be acquired. As another example, images corresponding to 2PAF, 3PAF, 4PAF, 2PF, SHG, and/or THG can be acquired. It will be appreciated by those skilled in the art that any suitable combination of the imaging modalities, contrasts, and/or processes described in the present disclosure can be simultaneously measured using conventional the multiphoton detection portion of the microscopy and/or imaging system.

Figure 5A:
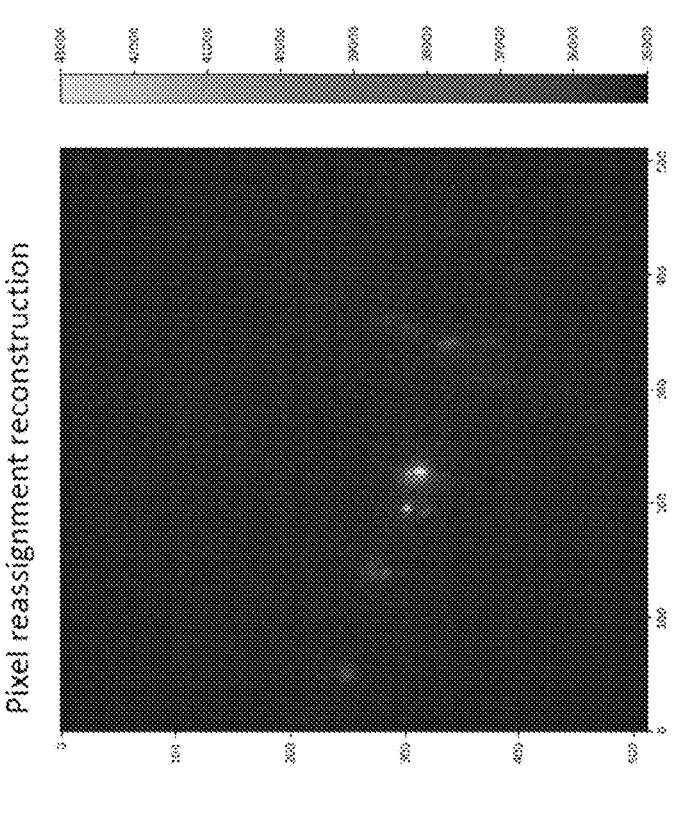
FIGS. 5A-5C are example images of nanodiamonds reconstructed from optical signal data acquired using temporally modulated grid pattern acquisitions.
Figure 5A:
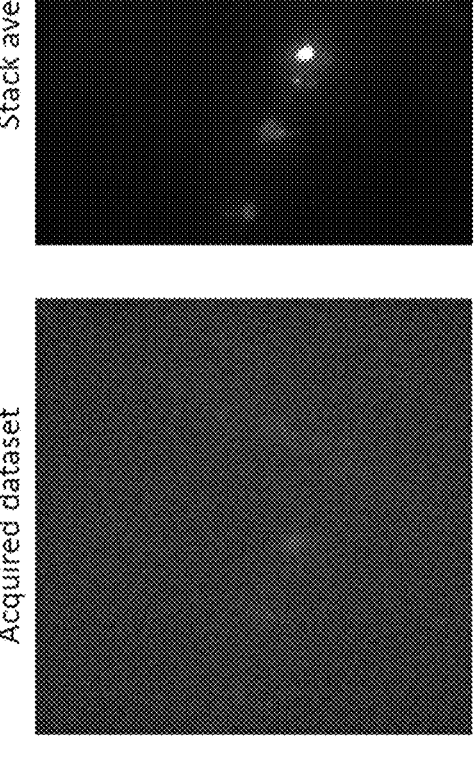
Figure 5B:
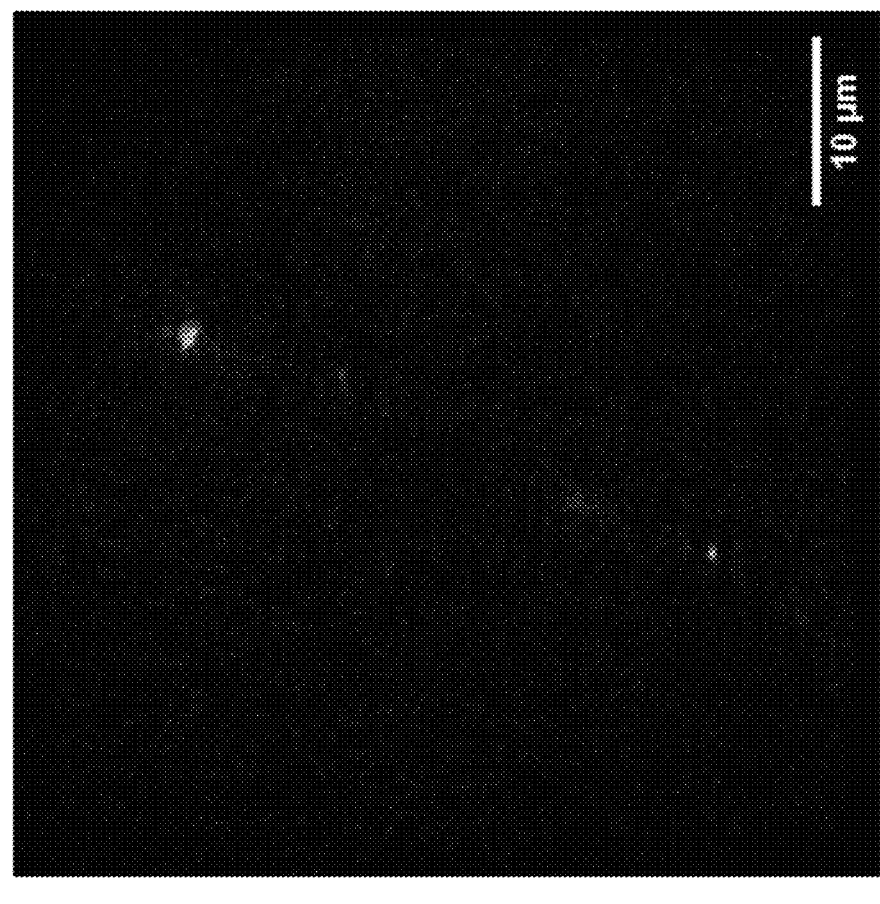
Figure 5B:
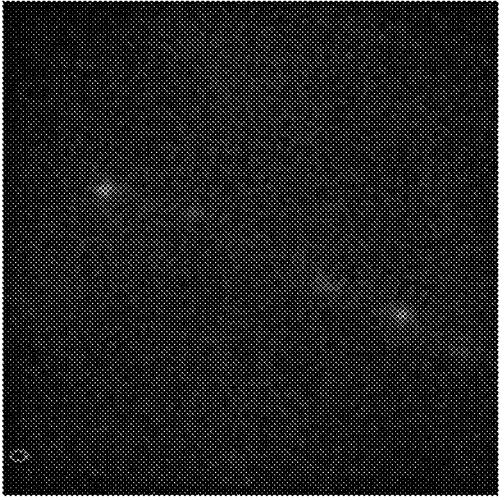
Figure 5B:
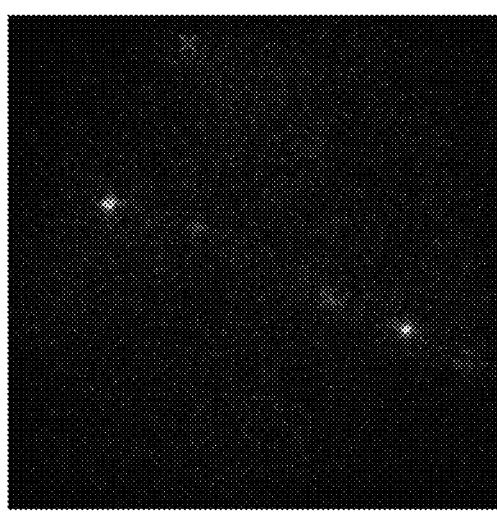
Figure 5C:
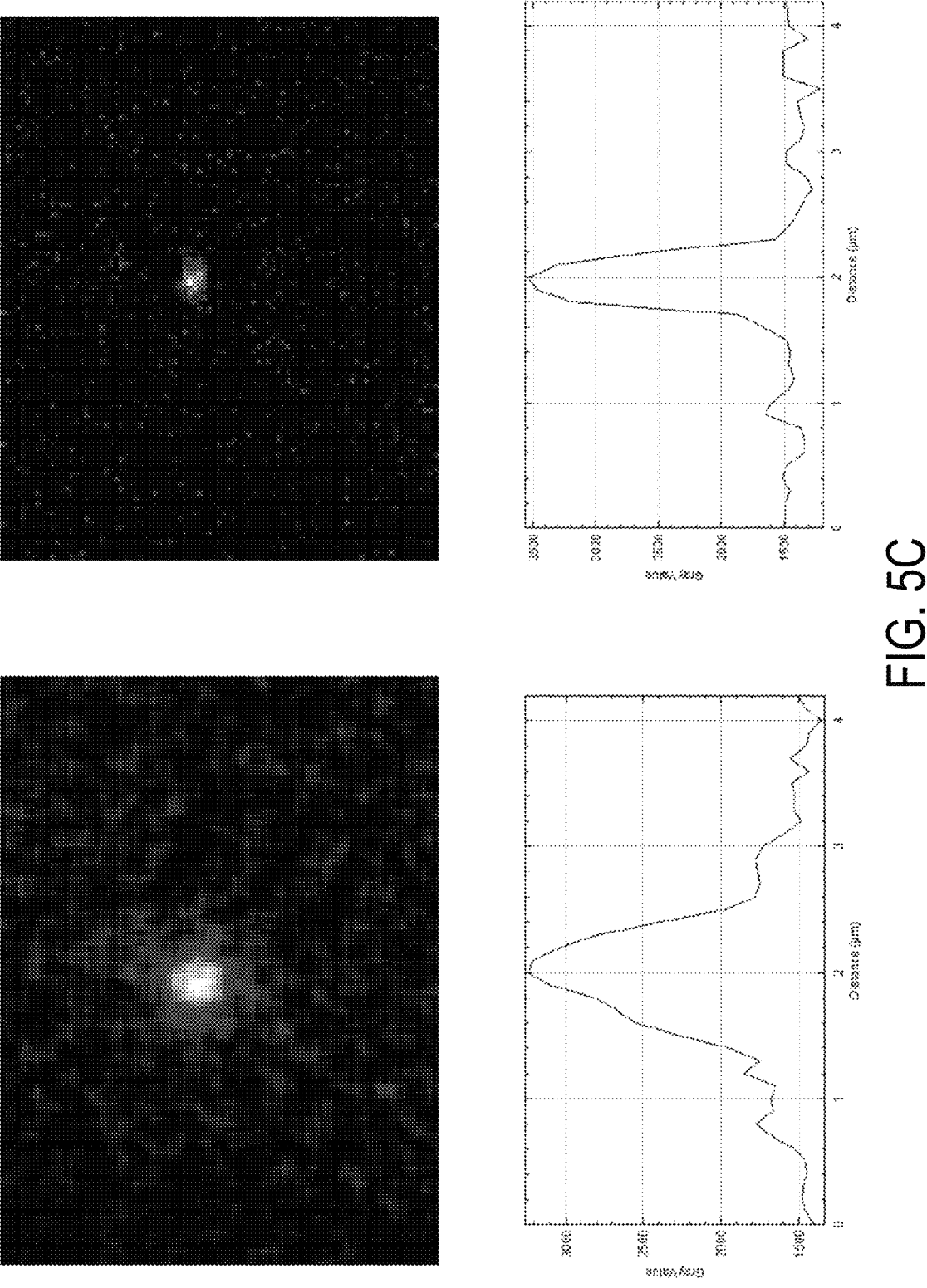

The reconstructed images can then be stored for later use and/or displayed to a user, as indicated at step 112. FIGS. 5A-5C show example images of nanodiamonds that were reconstructed from optical signal data acquired using grid acquisition patterns.

Figure 6A:
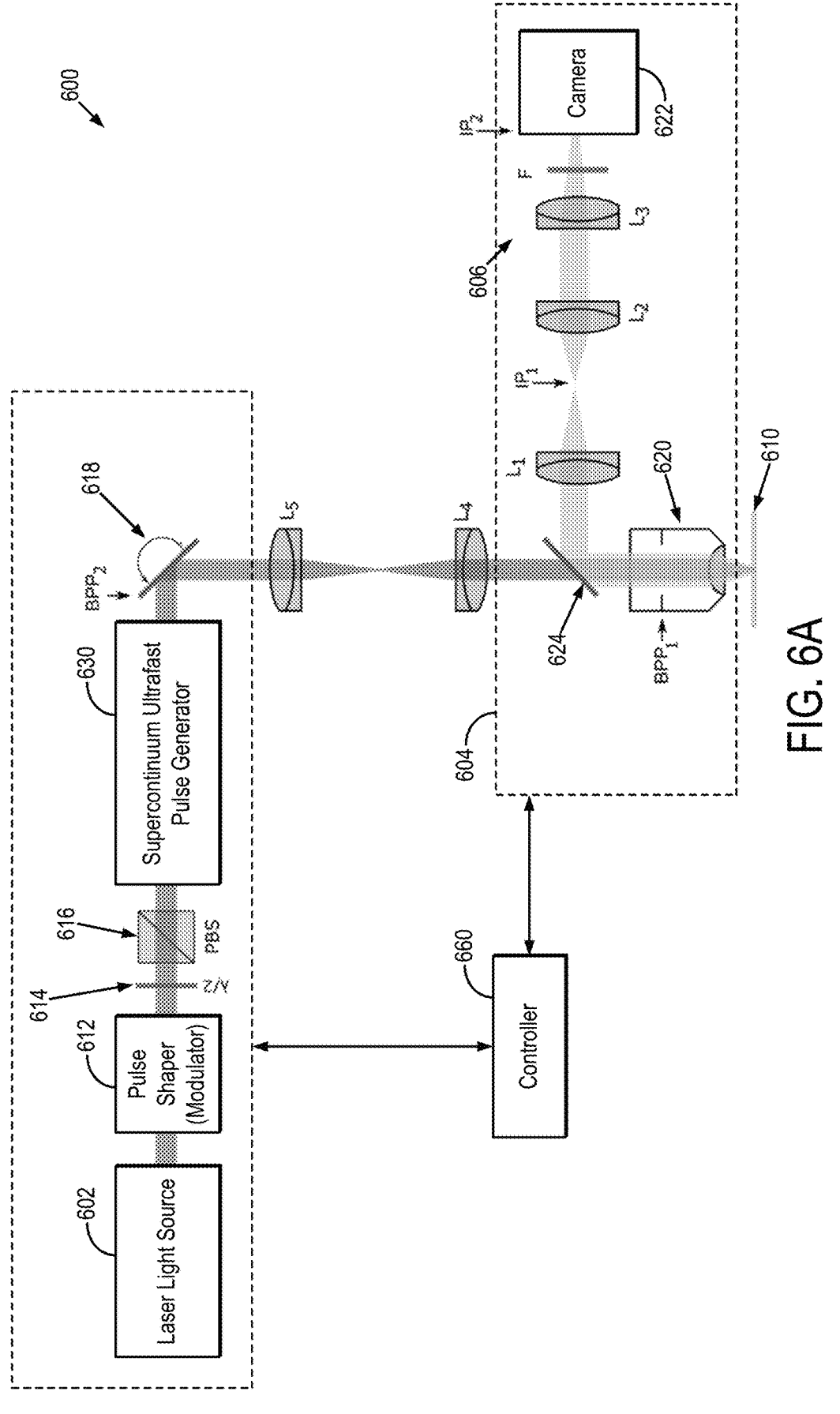
FIG. 6A is an example label-free nonlinear image scanning microscopy system in accordance with some embodiments described in the present disclosure.

Referring now to FIG. 6A, an example imaging system 600 that is configured for super-resolution, label-free nonlinear image scanning microscopy is illustrated. The imaging system 600 generally includes a laser light source 602 and a detection system 604. In some embodiments, the detection system 604 includes an image scanning microscopy ("ISM") detection system 606. In some other embodiments (e.g., those shown in FIG. 6B), the detection system 604 can include both an ISM detection system 606 and a multiphoton detection system 608. As will be described, in these instances the detection system 604 can select between the ISM detection system 606 and a multiphoton detection system 608 while imaging a sample 610. The sample 610 may include, for example, a biological sample containing a plurality of fluorophores of interest, harmonophores of interest, or combinations thereof.

Referring still to FIG. 6A, the laser light source 602 may be an ultrafast laser light source, such as a femtosecond laser. As one example, the laser light source 602 can include an extended cavity laser. As another example, the laser light source 602 can include a mode-locked laser, such as a mode-locked Yb-doped fiber laser. In still other examples, the laser light source 602 can include other solid-state Ti:Sapphire lasers, fiber lasers, semiconductor lasers, microchip lasers (e.g. Q-switched microchip lasers), or the like.

As mentioned above, the laser light source 602 is generally a femtosecond laser. The laser light source 602 may, for example, generate a single laser pulse with a wavelength band of $1040\pm30$ nm, a pulse repetition rate on the order of a few megahertz (e.g., 0.5-40 MHz), a pulse width less than 350 fs (e.g., 270 fs), and an average power of 50 mW or greater. However, the laser light source 602 may also emit pulses having different wavelengths, pulse repetition rates, pulse durations, and average powers. In some embodiments, the excitation source can be generated by shining the laser light source 602 over a crystal such as YAG, or periodically poled lithium niobate, to produce longer wavelengths of light, such as 1300 nm, 1550 nm, or 1700 nm.

In some configurations the imaging system 600 includes a pulse shaper 612. The pulse shaper may include a modulator, such as a 4f pulse shaper based on a spatial light modulator, or alternatively, may include a pulse compressor, such as a prism pair, a grating pair, or the like. As one example, the pulse shaper 612 can include a pulse modulator for time-gating the PSFs to specific locations on the field-of-view desired in each frame.

Additionally or alternatively, the imaging system 600 may include a waveplate 614 and/or a beam splitter 616, which may be a polarized beamsplitter, arranged between the laser light source 602 and the pulse shaper 612.

The laser light output from either the laser light source 602 or optional pulse shaper 612 can be transmitted to a supercontinuum ultrafast pulse generator 630. In these instances, the supercontinuum ultrafast pulse generator 630 enhances third order nonlinear processes, such as third harmonic generation ("THG") and 3-photon excitation fluorescence ("3PF"), by reducing the pulse width and increasing the peak power of each pulse.

The output of the supercontinuum ultrafast pulse generator 630 is transmitted to the detection system 604, where the output light is scanned by one or more scanners 618 over the sample 610 via an objective lens 620. The scanner(s) 618 may include one or more one-dimensional scanners, one or more two-dimensional scanners, or combinations thereof. As one example, the scanner(s) 618 can include two one-dimensional galvanometer scanners (i.e., galvo scanners), which may be conjugated by a telescope. Additionally or alternatively, the scanner(s) 618 may include a single two-dimensional scanner.

In general, the detection system 604 includes an ISM detection system 606, in which emission light from the sample 610 is delayed to a camera 622, which in some embodiments may be an EMCCD camera. As a non-limiting example, the emission light may be delayed to the camera 622 by using two telescopes. The camera 622 can be cooled to negative 70 degrees Celsius, or the like, to further reduce noise.

A controller 660 in communication with the imaging system 600 can control precise synchronization between the pulse shaper 612 (i.e., pulse modulator), camera trigger, and 2D scanning system (e.g., scanner(s) 618) to produce the patterns required for multiplexed imaging. A number of images are taken to cover the whole field-of-view, from which super-resolution images are reconstructed.

Figure 6B:
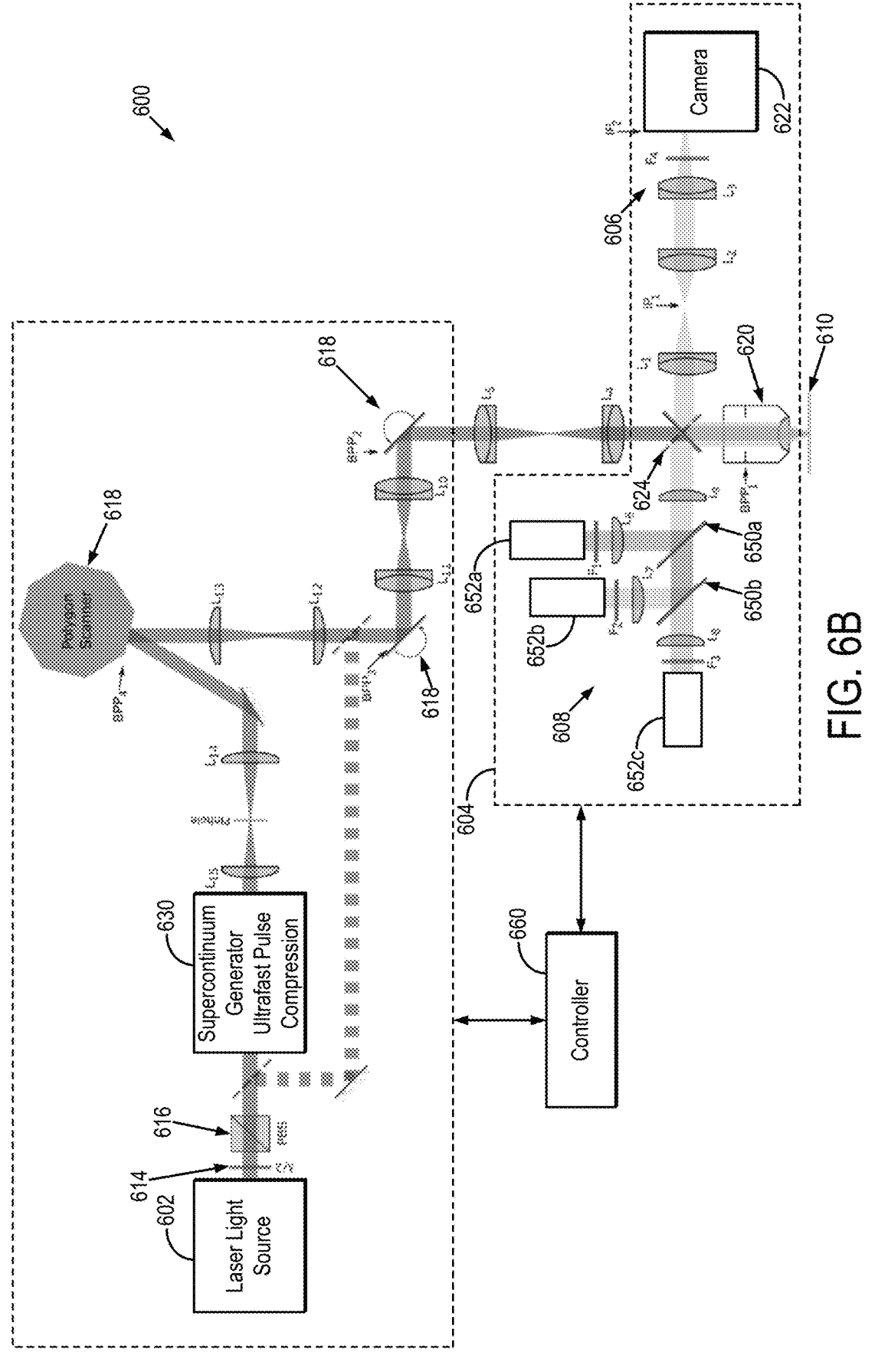
FIG. 6B is an example label-free nonlinear image scanning microscopy system with an additional multiphoton detection portion in accordance with some embodiments described in the present disclosure.

In an alternative configuration, such as the one shown in FIG. 6B, the detection system 604 of the imaging system 600 may include a multiphoton detection system 608 in addition to the ISM detection system 606. For instance, as one non-limiting example, the multiphoton detection system 608 can collect observed light using one or more high-sensitivity detectors, such as one or more photomultiplier tubes ("PMTs"). As a non-limiting example, a different PMT (or group of PMTs) can be used for each different imaging contrast (e.g., 2PAF, 3PAF, 4PAF, SHG, THG, etc.).

In these configurations, the dichroic mirror 624 can be flipped to select the beam path for the imaging beam between the ISM detection system 606 and the multiphoton detection system 608. For example, the dichroic mirror 624 can be coupled to an optical flip mount that allows for the orientation of the dichroic mirror 624 to be flipped to select the different imaging beam path.

The multiphoton detection system 608 may in some configurations include dichroic mirrors 650A-650B and PMTs 652A-652C to separate the light emitted by the fluorophores and/or harmonophores into spectrally distinct channels. The incoming beam from the pulse shaper 612 is sent through scanner(s) 614, dichroic mirror 624, and objective 620 to the sample 610. Dichroic mirror 624 is used to separate the excitation beam from the light emitted by the fluorophores and/or harmonophores in the sample 610.

The PMTs 652A-652C may be photon-counting PMTs, analog PMTs, or the like, and may include bandpass filters that work together with the dichroic mirrors (e.g., dichroic mirrors 650A-650B) to collect spectrally resolved multi-modal multiphoton signals in the PMTs 652A-652C.

As a non-limiting example, PMT 652A may include a filter that allows light with wavelengths between 365 nm and 375 nm to pass. The corresponding dichroic mirror 650A may have an edge of 409 nm, so that light below the edge wavelength is reflected into the photomultiplier 652A. The remaining light is sent to dichroic mirror 650B, which may have an edge of 506 nm. Therefore, light with a wavelength lower than 506 nm is reflected into PMT 652B. The PMT 652B includes a filter that allows light with wavelengths between 420 nm and 480 nm to pass. The remaining light that passes dichroic mirror 650B is sent to PMT 652C. PMT 652C may include a bandpass filter that allows light with wavelengths between 540 nm and 570 nm to pass. It will be appreciated by those skilled in the art that the edge wavelengths of dichroic mirrors 650A-650B and the bandpass filter wavelengths of PMTs 652A-652C described above are illustrative examples only. Any combination of mirror edge wavelength and bandpass filter wavelength that minimize crosstalk between individual channels and that lead to spectrally resolved, distinct signals generated by the PMTs 652A-652C may be chosen by the skilled person.

The three channels detected by the photomultipliers 652A-652C may correspond to light generated by the fluorophores and/or harmonophores in different modalities. For example, the three channels may be selected from THG, 3PAF, SHG, and 2PAF. However, any other modality or fluorescence process may be imaged through similar PMTs arrays detecting light generated by the corresponding molecules. Examples of other modalities and processes are first harmonic scattering, four-photon excited fluorescence of ultraviolet fluorophores (e.g., tryptophan), three-photon excited fluorescence of green fluorescent proteins (e.g., GCaMP-based calcium indicators), two-photon excited fluorescence of red/near-infrared dyes (e.g., DRAD5), and one-photon excited fluorescence of near-infrared fluorophores (i.e., carbon nanotube-based agents).

Figure 7:
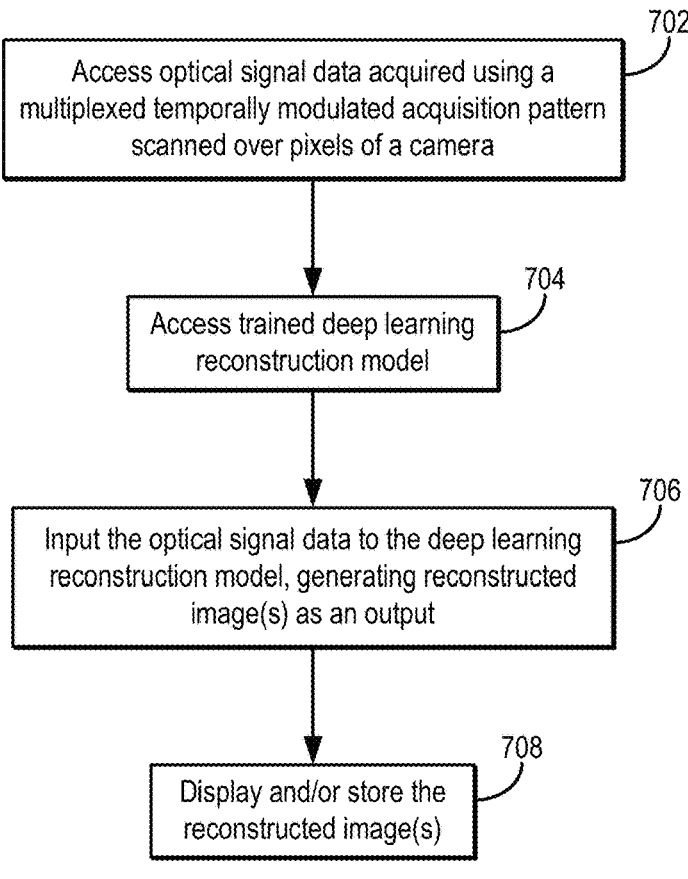
FIG. 7 is a flowchart setting forth the steps of an example method for reconstructing images from optical signal data using a deep learning model reconstruction.

As mentioned above, in some aspects image reconstruction is performed using a deep learning reconstruction model. Referring now to FIG. 7, a flowchart is illustrated as setting forth the steps of an example method for reconstructing an image from optical signal data using a suitably trained deep learning model, such as a neural network. As will be described, the deep learning reconstruction model takes optical signal data as input data and generates a high-resolution image as output data.

The method includes accessing optical signal data with a computer system, as indicated at step 702. Accessing the optical signal data may include retrieving such data from a memory or other suitable data storage device or medium. Additionally or alternatively, accessing the optical signal data may include acquiring such data with an ISM imaging system using a multiplexed, temporally modulated acquisition scheme, such as those described in the present disclosure, and transferring or otherwise communicating the data to the computer system, which may be a part of the ISM imaging system.

A trained deep learning reconstruction model (e.g., a neural network) is then accessed with the computer system, as indicated at step 704. In general, the deep learning reconstruction model can include a neural network that is trained, or has been trained, on training data in order to reconstruct images from optical signal data, such as optical signal data that have been acquired using a temporally modulated acquisition pattern of emission PSFs, such as a grid pattern, one or more stripe patterns, or the like.

Accessing the deep learning reconstruction model may include accessing network parameters (e.g., weights, biases, or both) that have been optimized or otherwise estimated by training the deep learning reconstruction model on training data. In some instances, retrieving the deep learning reconstruction model can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

An artificial neural network generally includes an input layer, one or more hidden layers (or nodes), and an output layer. Typically, the input layer includes as many nodes as inputs provided to the artificial neural network. The number (and the type) of inputs provided to the artificial neural network may vary based on the particular task for the artificial neural network.

The input layer connects to one or more hidden layers. The number of hidden layers varies and may depend on the particular task for the artificial neural network. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. In some configurations, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is generally associated with an activation function. The activation function defines how the hidden layer is to process the input received from the input layer or from a previous input or hidden layer. These activation functions may vary and be based on the type of task associated with the artificial neural network and also on the specific type of hidden layer implemented.

Each hidden layer may perform a different function. For example, some hidden layers can be convolutional hidden layers which can, in some instances, reduce the dimensionality of the inputs. Other hidden layers can perform statistical functions such as max pooling, which may reduce a group of inputs to the maximum value; an averaging layer; batch normalization; and other such functions. In some of the hidden layers each node is connected to each node of the next hidden layer, which may be referred to then as dense layers. Some neural networks including more than, for example, three hidden layers may be considered deep neural networks.

The last hidden layer in the artificial neural network is connected to the output layer. Similar to the input layer, the output layer typically has the same number of nodes as the possible outputs. The output layer may include, for example, one or more nodes corresponding to the output reconstructed image (e.g., a single output node for an image matrix).

The optical signal data are then input to the deep learning reconstruction model, generating output as a reconstructed image, as indicated at step 706. As noted above, the reconstructed image will have a higher spatial resolution and improved SNR.

The reconstructed image(s) generated by inputting the optical signal data to the deep learning reconstruction model can then be displayed to a user, stored for later use or further processing, or both, as indicated at step 708.

Figure 8:
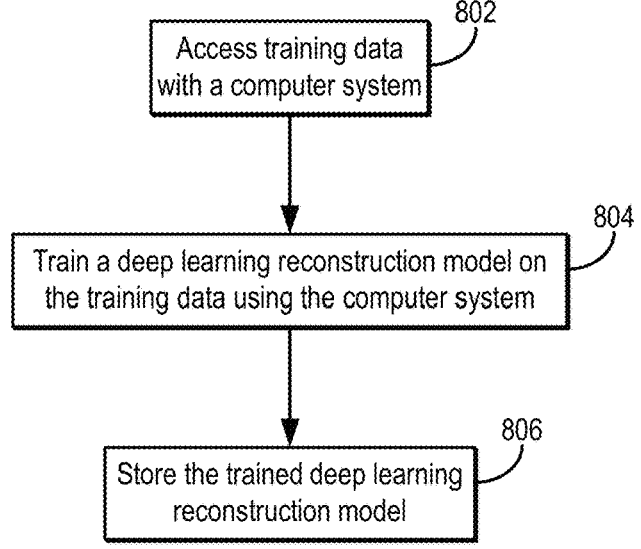
FIG. 8 is a flowchart setting forth the steps of an example method for training a deep learning reconstruction model.

Referring now to FIG. 8, a flowchart is illustrated as setting forth the steps of an example method for training one or more deep learning reconstruction models on training data, such that the one or more deep learning reconstruction models are trained to receive optical signal data as input data in order to generate a reconstructed image as output data.

In general, the deep learning model can implement any number of different artificial neural network architectures. For instance, the neural network(s) could implement a convolutional neural network, a residual neural network, or the like. Alternatively, the neural network(s) could be replaced with other suitable deep learning models.

The method includes accessing training data with a computer system, as indicated at step 802. Accessing the training data may include retrieving such data from a memory or other suitable data storage device or medium. Alternatively, accessing the training data may include acquiring such data with an ISM imaging system and transferring or otherwise communicating the data to the computer system. In still other instances, accessing the training data may include generating synthetic training data with the computer system, such as by simulating synthetic training data.

In general, the training data can include synthetic data sets, which may include simulated or otherwise synthetic optical signal data. For example, the synthetic data sets may include simulated patterns of emission PSFs. Additionally, the training data may include other data, such as reconstructed images paired with the synthetic data sets. In these instances, the synthetic data sets and corresponding reconstructed images can form input/output pairs for training the deep learning reconstruction model.

A deep learning reconstruction model is then trained on the training data, as indicated at step 804. In general, the deep learning reconstruction model can be trained by optimizing network parameters (e.g., weights, biases, or both) based on minimizing a loss function. As one non-limiting example, the loss function may be a mean squared error loss function.

As an example, training a neural network may include initializing the neural network, such as by computing, estimating, or otherwise selecting initial network parameters (e.g., weights, biases, or both). During training, an artificial neural network receives the inputs for a training example and generates an output using the bias for each node, and the connections between each node and the corresponding weights. For instance, training data can be input to the initialized neural network, generating output as a reconstructed image. The artificial neural network then compares the generated output with the actual output of the training example in order to evaluate the quality of the reconstructed image. For instance, the reconstructed image can be passed to a loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. The training continues until a training condition is met. The training condition may correspond to, for example, a predetermined number of training examples being used, a minimum accuracy threshold being reached during training and validation, a predetermined number of validation iterations being completed, and the like. When the training condition has been met (e.g., by determining whether an error threshold or other stopping criterion has been satisfied), the current neural network and its associated network parameters represent the trained neural network. Different types of training processes can be used to adjust the bias values and the weights of the node connections based on the training examples. The training processes may include, for example, gradient descent, Newton's method, conjugate gradient, quasi-Newton, Levenberg-Marquardt, among others.

The artificial neural network can be constructed or otherwise trained based on training data using one or more different learning techniques, such as supervised learning, unsupervised learning, reinforcement learning, ensemble learning, active learning, transfer learning, or other suitable learning techniques for neural networks. As an example, supervised learning involves presenting a computer system with example inputs and their actual outputs (e.g., categorizations). In these instances, the artificial neural network is configured to learn a general rule or model that maps the inputs to the outputs based on the provided example input-output pairs.

The deep learning reconstruction model(s) are then stored for later use, as indicated at step 806. Storing the deep learning reconstruction model(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

Figure 9:
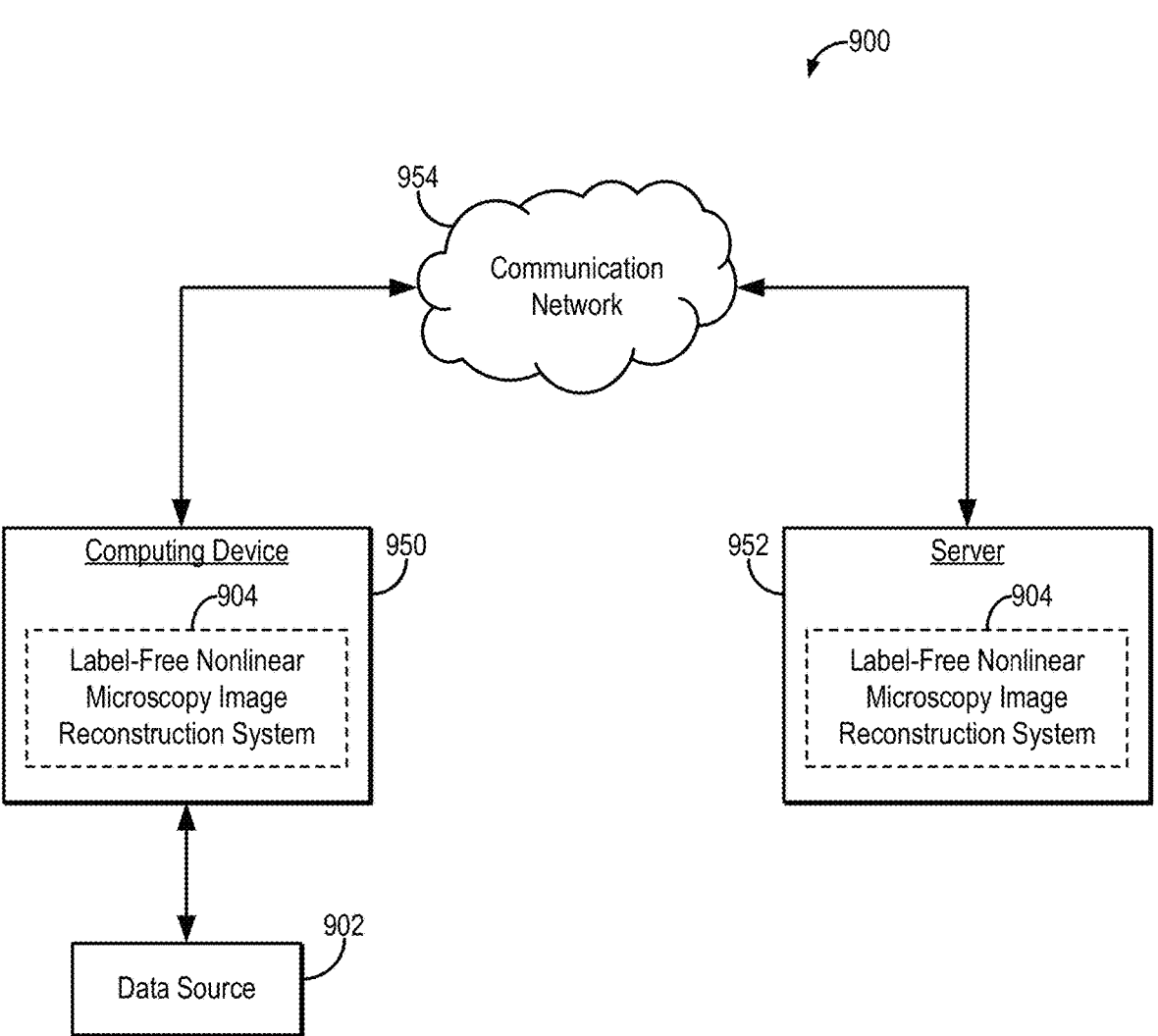
FIG. 9 is a block diagram of an example label-free nonlinear microscopy image reconstruction system.

Referring now to FIG. 9, an example of a system 900 for reconstructing super-resolution images from optical signal data acquired using a label-free, nonlinear microscopy system in accordance with some embodiments of the systems and methods described in the present disclosure is shown. As shown in FIG. 9, a computing device 950 can receive one or more types of data (e.g., optical signal data, multiphoton optical signal data) from data source 902. In some embodiments, computing device 950 can execute at least a portion of a label-free nonlinear microscopy image reconstruction system 904 to reconstruct images from data received from the data source 902.

Additionally or alternatively, in some embodiments, the computing device 950 can communicate information about data received from the data source 902 to a server 952 over a communication network 954, which can execute at least a portion of the label-free nonlinear microscopy image reconstruction system 904. In such embodiments, the server 952 can return information to the computing device 950 (and/or any other suitable computing device) indicative of an output of the label-free nonlinear microscopy image reconstruction system 904.

In some embodiments, computing device 950 and/or server 952 can be any suitable computing device or combination of devices, such as a desktop computer, a laptop computer, a smartphone, a tablet computer, a wearable computer, a server computer, a virtual machine being executed by a physical computing device, and so on. The computing device 950 and/or server 952 can also reconstruct images from the data.

In some embodiments, data source 902 can be any suitable source of data (e.g., measurement data, images reconstructed from measurement data, processed image data), such as an ISM imaging system such as those described in the present disclosure, another computing device (e.g., a server storing measurement data, images reconstructed from measurement data, processed image data), and so on. In some embodiments, data source 902 can be local to computing device 950. For example, data source 902 can be incorporated with computing device 950 (e.g., computing device 950 can be configured as part of a device for measuring, recording, estimating, acquiring, or otherwise collecting or storing data). As another example, data source 902 can be connected to computing device 950 by a cable, a direct wireless link, and so on. Additionally or alternatively, in some embodiments, data source 902 can be located locally and/or remotely from computing device 950, and can communicate data to computing device 950 (and/or server 952) via a communication network (e.g., communication network 954).

In some embodiments, communication network 954 can be any suitable communication network or combination of communication networks. For example, communication network 954 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), other types of wireless network, a wired network, and so on. In some embodiments, communication network 954 can be a local area network, a wide area network, a public network (e.g., the Internet), a private or semi-private network (e.g., a corporate or university intranet), any other suitable type of network, or any suitable combination of networks. Communications links shown in FIG. 9 can each be any suitable communications link or combination of communications links, such as wired links, fiber optic links, Wi-Fi links, Bluetooth links, cellular links, and so on.

Figure 10:
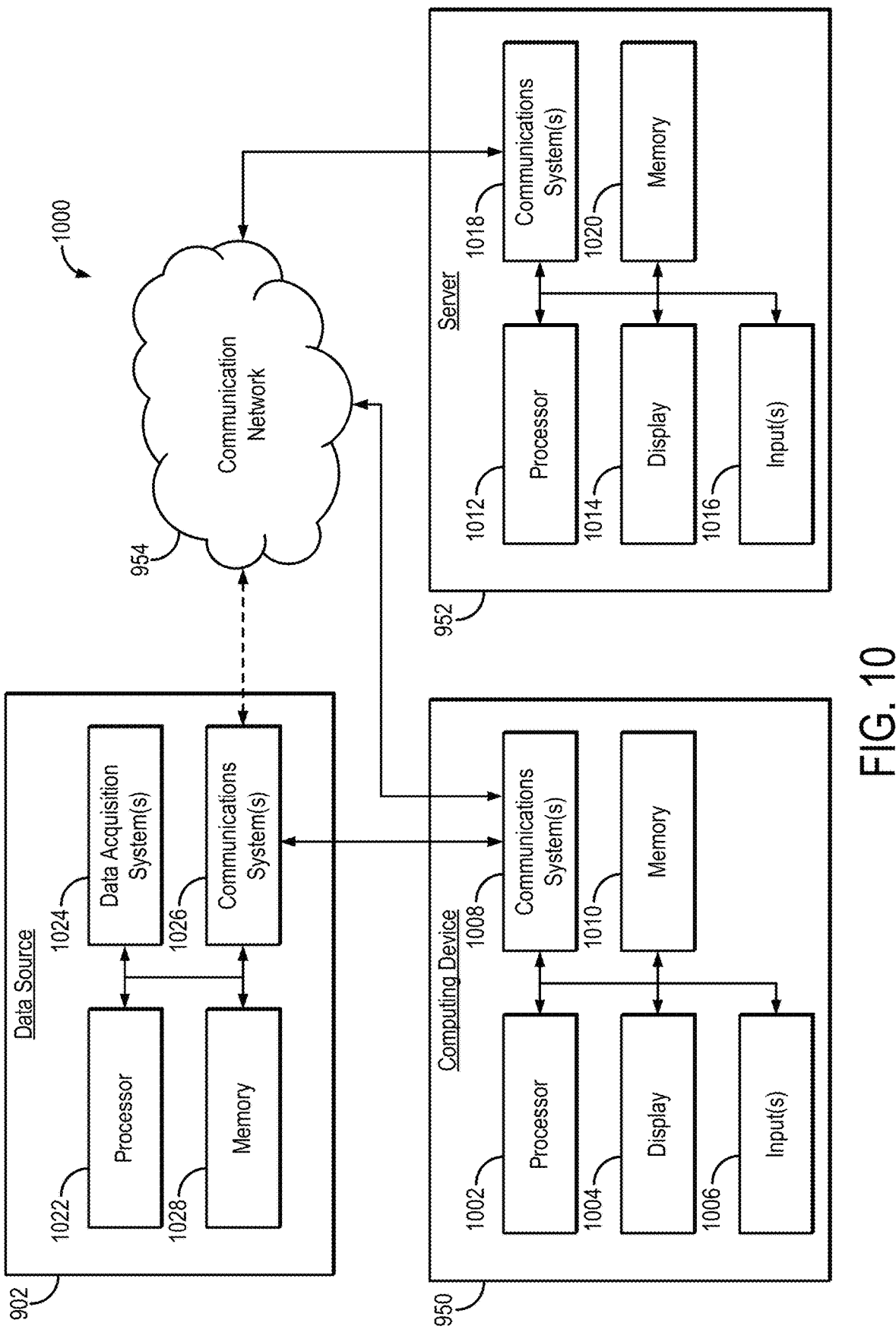
FIG. 10 is a block diagram of example components that can implement the system of FIG. 9.

Referring now to FIG. 10, an example of hardware 1000 that can be used to implement data source 902, computing device 950, and server 952 in accordance with some embodiments of the systems and methods described in the present disclosure is shown.

As shown in FIG. 10, in some embodiments, computing device 950 can include a processor 1002, a display 1004, one or more inputs 1006, one or more communication systems 1008, and/or memory 1010. In some embodiments, processor 1002 can be any suitable hardware processor or combination of processors, such as a central processing unit ("CPU"), a graphics processing unit ("GPU"), and so on. In some embodiments, display 1004 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 1006 can include any suitable input devices and/or sensors that can be used to receive user input, such as a keyboard, a mouse, a touchscreen, a microphone, and so on.

In some embodiments, communications systems 1008 can include any suitable hardware, firmware, and/or software for communicating information over communication network 954 and/or any other suitable communication networks. For example, communications systems 1008 can include one or more transceivers, one or more communication chips and/or chip sets, and so on. In a more particular example, communications systems 1008 can include hardware, firmware, and/or software that can be used to establish a Wi-Fi connection, a Bluetooth connection, a cellular connection, an Ethernet connection, and so on.

In some embodiments, memory 1010 can include any suitable storage device or devices that can be used to store instructions, values, data, or the like, that can be used, for example, by processor 1002 to present content using display 1004, to communicate with server 952 via communications system(s) 1008, and so on. Memory 1010 can include any suitable volatile memory, non-volatile memory, storage, or any suitable combination thereof. For example, memory 1010 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 1010 can have encoded thereon, or otherwise stored therein, a computer program for controlling operation of computing device 950. In such embodiments, processor 1002 can execute at least a portion of the computer program to present content (e.g., images, user interfaces, graphics, tables), receive content from server 952, transmit information to server 952, and so on. For example, the processor 1002 and the memory 1010 can be configured to perform the methods described herein (e.g., the method of FIG. 1, the method of FIG. 7, the method of FIG. 8, methods for controlling the synchronous operation of an ISM system).

In some embodiments, server 952 can include a processor 1012, a display 1014, one or more inputs 1016, one or more communications systems 1018, and/or memory 1020. In some embodiments, processor 1012 can be any suitable hardware processor or combination of processors, such as a CPU, a GPU, and so on. In some embodiments, display 1014 can include any suitable display devices, such as an LCD screen, LED display, OLED display, electrophoretic display, a computer monitor, a touchscreen, a television, and so on. In some embodiments, inputs 1016 can include any suitable input devices and/or sensors that can be used to receive user input, such as a keyboard, a mouse, a touchscreen, a microphone, and so on.

In some embodiments, communications systems 1018 can include any suitable hardware, firmware, and/or software for communicating information over communication network 954 and/or any other suitable communication networks. For example, communications systems 1018 can include one or more transceivers, one or more communication chips and/or chip sets, and so on. In a more particular example, communications systems 1018 can include hardware, firmware, and/or software that can be used to establish a Wi-Fi connection, a Bluetooth connection, a cellular connection, an Ethernet connection, and so on.

In some embodiments, memory 1020 can include any suitable storage device or devices that can be used to store instructions, values, data, or the like, that can be used, for example, by processor 1012 to present content using display 1014, to communicate with one or more computing devices 950, and so on. Memory 1020 can include any suitable volatile memory, non-volatile memory, storage, or any suitable combination thereof. For example, memory 1020 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1020 can have encoded thereon a server program for controlling operation of server 952. In such embodiments, processor 1012 can execute at least a portion of the server program to transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone), and so on.

In some embodiments, the server 952 is configured to perform the methods described in the present disclosure. For example, the processor 1012 and memory 1020 can be configured to perform the methods described herein (e.g., the method of FIG. 1, the method of FIG. 7, the method of FIG. 8, methods for controlling the synchronous operation of an ISM system).

In some embodiments, data source 902 can include a processor 1022, one or more data acquisition systems 1024, one or more communications systems 1026, and/or memory 1028. In some embodiments, processor 1022 can be any suitable hardware processor or combination of processors, such as a CPU, a GPU, and so on. In some embodiments, the one or more data acquisition systems 1024 are generally configured to acquire data, images, or both, and can include an ISM imaging system such as those described in the present disclosure, or other suitable imaging systems. Additionally or alternatively, in some embodiments, the one or more data acquisition systems 1024 can include any suitable hardware, firmware, and/or software for coupling to and/or controlling operations of an imaging system, such as the ISM imaging systems described in the present disclosure. In some embodiments, one or more portions of the data acquisition system(s) 1024 can be removable and/or replaceable.

Note that, although not shown, data source 902 can include any suitable inputs and/or outputs. For example, data source 902 can include input devices and/or sensors that can be used to receive user input, such as a keyboard, a mouse, a touchscreen, a microphone, a trackpad, a trackball, and so on. As another example, data source 902 can include any suitable display devices, such as an LCD screen, an LED display, an OLED display, an electrophoretic display, a computer monitor, a touchscreen, a television, etc., one or more speakers, and so on.

In some embodiments, communications systems 1026 can include any suitable hardware, firmware, and/or software for communicating information to computing device 950 (and, in some embodiments, over communication network 954 and/or any other suitable communication networks). For example, communications systems 1026 can include one or more transceivers, one or more communication chips and/or chip sets, and so on. In a more particular example, communications systems 1026 can include hardware, firmware, and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1028 can include any suitable storage device or devices that can be used to store instructions, values, data, or the like, that can be used, for example, by processor 1022 to control the one or more data acquisition systems 1024, and/or receive data from the one or more data acquisition systems 1024; to generate images from data; present content (e.g., data, images, a user interface) using a display; communicate with one or more computing devices 950; and so on. Memory 1028 can include any suitable volatile memory, non-volatile memory, storage, or any suitable combination thereof. For example, memory 1028 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1028 can have encoded thereon, or otherwise stored therein, a program for controlling operation of data source 902. In such embodiments, processor 1022 can execute at least a portion of the program to generate images, transmit information and/or content (e.g., data, images, a user interface) to one or more computing devices 950, receive information and/or content from one or more computing devices 950, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

The present disclosure has described one or more preferred embodiments, and it should be appreciated that many equivalents, alternatives, variations, and modifications, aside from those expressly stated, are possible and within the scope of the invention.

The invention claimed is:

1. A method for generating an image of a sample using label-free microscopy, comprising:
   (a) exciting a sample via a laser light source;
   (b) acquiring optical signal data by detecting light emitted by the sample by scanning the emitted light over pixels in a camera according to a spatial pattern over the pixels;
   (c) acquiring additional optical signal data by detecting the light emitted by the sample by scanning the emitted light over pixels in the camera while temporally modulating the spatial pattern; and
   (d) reconstructing an image from the optical signal data and the additional optical signal data.

2. The method of claim 1, wherein the spatial pattern is a grid pattern.

3. The method of claim 2, wherein reconstructing the image comprises:
   processing the optical signal data and the additional optical signal data using a pixel reassignment to generate a first and second image, respectively; and
   combining the first and second image to generate the reconstructed image.

4. The method of claim 3, further comprising applying a deconvolution to the optical signal data and the additional optical signal data during the pixel reassignment.

5. The method of claim 2, wherein reconstructing the image comprises:
   accessing a deep learning reconstruction model with a computer system, wherein the deep learning reconstruction model has been trained on training data to generate an image from optical signal data acquired using temporally modulated acquisition patterns; and
   inputting the optical signal data and the additional optical signal data to the deep learning reconstruction model, generating the reconstructed image as an output.

6. The method of claim 5, wherein the deep learning reconstruction model comprises a neural network.

7. The method of claim 1, wherein the spatial pattern is a stripe pattern and temporally modulating the stripe pattern comprises at least one of shifting the stripe pattern or rotating the stripe pattern.

8. The method of claim 7, wherein the optical signal data are acquired using a first stripe pattern having horizontally oriented stripes and the additional optical signal data are acquired using a second stripe pattern having vertically oriented stripes.

9. The method of claim 7, wherein reconstructing the image comprises:
   computing a first gradient from the optical signal data and a second gradient from the additional signal data;
   computing an inverse wavelet transform of the first gradient and the second gradient, generating wavelet transformed data; and
   reconstructing the image based on the wavelet transformed data.

10. The method of claim 1, wherein the spatial pattern comprises a spatial pattern of emission point spread functions.

11. The method of claim 1, wherein the optical signal data comprises nonlinear optical signal data.

12. The method of claim 11, wherein the nonlinear optical signal data are indicative of harmonic generation.

13. The method of claim 1, wherein the laser light source comprises a femtosecond laser light source.

14. The method of claim 1, wherein exciting the sample via the laser light source includes generating supercontinuum ultrafast pulses with the laser light source to enhance nonlinear processes by reducing pulse width and increasing peak power of each pulse of the laser light source.

15. The method of claim 14, wherein the nonlinear processes comprise third order nonlinear processes.

16. A method for generating a super-resolution image of a sample using label-free microscopy, the method comprising:

(a) exciting a sample by scanning a femtosecond light source over the sample while temporally modulating the femtosecond light source to produce a spatial pattern;

(b) acquiring optical signal data by detecting light emitted by the sample over pixels in a camera, wherein the emitted light is projected over the pixels in the camera according to the spatial pattern;

(c) acquiring additional optical signal data by moving the spatial pattern exciting the sample in at least one spatial dimension and detecting the light emitted by the sample over pixels in the camera; and (d) reconstructing a super-resolution image from the optical signal data and the additional optical signal data.

17. The method of claim 16, wherein the spatial pattern is a grid.

18. The method of claim 16, wherein the spatial pattern is a stripe pattern and temporally modulating the stripe pattern comprises at least one of shifting the stripe pattern or rotating the stripe pattern.

19. The method of claim 18, wherein the optical signal data are acquired using a first stripe pattern having horizontally oriented stripes and the additional optical signal data are acquired using a second stripe pattern having vertically oriented stripes.

* * * * *